United States Patent
Khan

(10) Patent No.: US 8,019,006 B2
(45) Date of Patent: Sep. 13, 2011

(54) APPARATUS AND METHOD FOR FT PRE-CODING OF DATA AND CONTROL SIGNALS TO REDUCE PAPR IN A MULTI-CARRIER WIRELESS NETWORK

(75) Inventor: Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1271 days.

(21) Appl. No.: 11/374,863

(22) Filed: Mar. 14, 2006

(65) Prior Publication Data

US 2006/0262870 A1 Nov. 23, 2006

Related U.S. Application Data

(60) Provisional application No. 60/682,922, filed on May 19, 2005.

(51) Int. Cl.
*H04K 1/10* (2006.01)

(52) U.S. Cl. ........ 375/260; 375/340; 370/203; 370/204; 370/206; 370/208; 370/210; 370/344; 370/480

(58) Field of Classification Search .................. 375/260, 375/340; 370/203, 204, 206, 208, 210
See application file for complete search history.

(56) References Cited

U.S. PATENT DOCUMENTS

| | | | | |
|---|---|---|---|---|
| 6,996,418 | B2* | 2/2006 | Teo et al. | 455/562.1 |
| 7,206,350 | B2* | 4/2007 | Korobkov et al. | 375/260 |
| 2005/0286648 | A1* | 12/2005 | Feng et al. | 375/260 |
| 2008/0186843 | A1* | 8/2008 | Ma et al. | 370/210 |

\* cited by examiner

*Primary Examiner* — Leon Flores

(57) ABSTRACT

A subscriber station is provided for use in a wireless network communicating according to a multi-carrier protocol, such as OFDM or OFDMA. The subscriber station comprises: a size M1 Fourier Transform (FT) block that receives input symbols and generates M1 FT pre-coded outputs; a size M2 Fourier Transform (FT) block that receives input symbols and generates M2 FT pre-coded outputs; and a size N inverse Fourier Transform (IFT) block that receives N inputs, including the M1 FT pre-coded outputs and the M2 FT pre-coded outputs, and generates N outputs to be transmitted to a base station. The FT blocks are Fast Fourier Transform blocks or Discrete Fourier Transform blocks. The IFT block is an inverse Fast Fourier Transform block or an inverse Discrete Fourier Transform block.

20 Claims, 8 Drawing Sheets

| OFDM SYM. NO. | 1 | 2 | 3 | 4 | 5 | 6 | 7 | 8 | |
|---|---|---|---|---|---|---|---|---|---|
| SC 000 | D1 | D1 | D1 | D1 | D1 | D1 | D1 | D1 | |
| SC 001 | D1 | D1 | D1 | D1 | D1 | D1 | D1 | D1 | M1 = 256 |
| ⋮ | | | | | | | | | |
| SC 254 | D1 | D1 | D1 | D1 | D1 | D1 | D1 | D1 | |
| SC 255 | D1 | D1 | D1 | D1 | D1 | D1 | D1 | D1 | |
| SC 256 | S1 | S1 | S1 | S1 | S1 | S1 | S1 | S1 | M2 = 2 |
| SC 257 | S1 | S1 | S1 | S1 | S1 | S1 | S1 | S1 | |
| SC 258 | D2 | D2 | D2 | D2 | D2 | D2 | D2 | D2 | |
| SC 259 | D2 | D2 | D2 | D2 | D2 | D2 | D2 | D2 | M3 = 128 |
| ⋮ | | | | | | | | | |
| SC 384 | D2 | D2 | D2 | D2 | D2 | D2 | D2 | D2 | |
| SC 385 | D2 | D2 | D2 | D2 | D2 | D2 | D2 | D2 | |
| SC 386 | S2 | S2 | S2 | S2 | S2 | S2 | S2 | S2 | M4 = 8 |
| SC 387 | S2 | S2 | S2 | S2 | S2 | S2 | S2 | S2 | |
| ⋮ | | | | | | | | | |
| SC 392 | S2 | S2 | S2 | S2 | S2 | S2 | S2 | S2 | |
| SC 393 | S2 | S2 | S2 | S2 | S2 | S2 | S2 | S2 | |

FIG. 6

APPARATUS AND METHOD FOR FT PRE-CODING OF DATA AND CONTROL SIGNALS TO REDUCE PAPR IN A MULTI-CARRIER WIRELESS NETWORK

CROSS-REFERENCE TO RELATED APPLICATION AND CLAIM OF PRIORITY

The present application is related to U.S. Provisional Patent No. 60/682,922, filed May 19, 2005, entitled "Multiplexing of FFT-Precoded Data and Signaling". U.S. Provisional Patent No. 60/682,922 is assigned to the assignee of this application and is incorporated by reference as if fully set forth herein. The present application hereby claims priority under 35 U.S.C. §119(e) to U.S. Provisional Patent No. 60/682,922.

CROSS-REFERENCE TO RELATED APPLICATION(S)

The present application is related to U.S. patent application Ser. No. 11/374,928, entitled "Apparatus and Method for FT Pre-Coding of Data To Reduce PAPR in a Multi-Carrier Wireless Network," filed concurrently herewith. Application Ser. No. 11/374,928 is assigned to the assignee of this application. The subject matter disclosed in application Ser. No. 11/374,928 is incorporated by reference as if fully set forth herein.

TECHNICAL FIELD OF THE INVENTION

The present application relates generally to wireless communications and, more specifically, to a mechanism for Fourier Transform pre-coding of data to reduce peak-to-average power ratio (PAPR) in a multi-carrier wireless network.

BACKGROUND OF THE INVENTION

Orthogonal frequency division multiplexing (OFDM) is a multi-carrier transmission technique in which a user transmits on many orthogonal frequencies (or subcarriers). The orthogonal subcarriers are individually modulated and separated in frequency such that they do not interfere with one another. This provides high spectral efficiency and resistance to multipath effects. An orthogonal frequency division multiple access (OFDMA) system allows some subcarriers to be assigned to different users, rather than to a single user. Today, OFDM and OFDMA technology are used in both wireline transmission systems, such as asymmetric digital subscriber line (ADSL), and wireless transmission systems, such as IEEE-802.11a/g (i.e., WiFi), IEEE-802.16 (e.g., WiMAX), digital audio broadcast (DAB), and digital video broadcast (DVB). This technology is also used for wireless digital audio and video broadcasting.

Conventional power amplifiers for amplifying multi-carrier signals are relatively expensive parts of a communication system. A key design parameter for OFDM and OFDMA power amplifiers is the requirement to minimize the generation of adjacent channel power (ACP) noise. ACP noise results from signal distortion caused by operation of power amplifier components in non-linear regions of the input-output characteristic such as when the power amplifier enters saturation. This distortion produces undesired spectral components in adjacent transmission channels.

Power amplifiers are more linear at lower input signal levels. Large input signals tend to drive a power amplifier into saturation. Thus, weaker signals experience less distortion and have lower ACP noise. However, a sudden large signal peak still results in distortion and ACP noise. This is especially problematic in systems that have large peak-to-average power ratios (i.e., high crest factors), such as OFDM and OFDMA systems. To avoid this, power amplifiers often operate in "back-off" mode (i.e., reduced input signal) in order to accommodate large signal peaks. However, operating in back-off mode requires the use of devices with higher power ratings which adds to system design, development and manufacturing costs. Furthermore, it may be inefficient and may generate excessive heat.

Therefore, there is a need for improved OFDM and OFDMA transmission system that minimize amplifier peak-to-average power ratio (PAPR) without suffering performance degradation.

SUMMARY OF THE INVENTION

A subscriber station is provided for use in a wireless network capable of communicating according to a multi-carrier protocol, such as OFDM or OFDMA. In one embodiment, the subscriber station comprises: a size M1 Fourier Transform (FT) block capable of receiving input symbols and generating therefrom M1 FT pre-coded outputs; a size M2 Fourier Transform (FT) block capable of receiving input symbols and generating therefrom M2 FT pre-coded outputs; and a size N inverse Fourier Transform (IFT) block capable of receiving N inputs, the N inputs including the M1 FT pre-coded outputs from the size M1 FT block and the M2 FT pre-coded outputs from the size M2 FT block, and generating therefrom N outputs to be transmitted to a base station of the wireless network.

In the exemplary embodiment of the subscriber station, the size M1 FT block and the size M2 FT block are one of: 1) Fast Fourier Transform (FFT) blocks and 2) Discrete Fourier Transform (DFT) blocks. The size N IFT block is one of: 1) an inverse Fast Fourier Transform (IFFT) block and 2) an inverse Discrete Fourier Transform (IDFT) block.

A method also is provided for reducing the peak-to-average power ration (PAPR) of a radio frequency signal transmitted by a subscriber station to a base station of a wireless network. The method comprises the steps of: receiving input symbols to be transmitted to the base station; performing a size M1 Fourier Transform (FT) operation on a first subset of the received input symbols to thereby generate M1 FT pre-coded outputs; performing a size M2 Fourier Transform (FT) operation on a second subset of the received input symbols to thereby generate M2 FT pre-coded outputs; and performing a size N inverse Fourier Transform (IFT) operation on N inputs, the N inputs including the M1 FT pre-coded outputs and the M2 FT pre-coded outputs, to thereby generate N outputs to be transmitted to the base station.

In the exemplary embodiment of the method, the size M1 FT operation and the size M2 FT operation are one of: 1) Fast Fourier Transform (FFT) operations and 2) Discrete Fourier Transform (DFT) operations, and the size N IFT operation is one of: 1) an inverse Fast Fourier Transform (IFFT) operation and 2) an inverse Discrete Fourier Transform (IDFT) operation.

In another embodiment, a base station is provided for use in a wireless network capable of communicating with subscriber stations according to a multi-carrier protocol. The base station comprises: down-conversion circuitry capable of receiving incoming radio frequency signals from the subscriber stations and generating therefrom a baseband signal; a size N Fourier Transform (FT) block capable of receiving the baseband signal on N inputs and performing an FT operation to generate N outputs; a size M1 Inverse Fourier Transform (IFT) block capable of receiving M1 outputs of the size N FT block and performing a size M1 IFT operation on the M1 outputs to generate a first plurality of symbols transmitted by a first one of the subscriber stations; and a size M2 Inverse Fourier Transform (IFT) block capable of receiving M2 outputs of the size N FT block and performing a size M2 IFT operation on the M2 outputs to generate a second plurality of symbols transmitted by the first subscriber station.

In the exemplary embodiment of the base station, the size N FT block is one of: 1) a Fast Fourier Transform (FFT) block and 2) a Discrete Fourier Transform (DFT) block, and the size M1 IFT block and the size M2 IFT block are one of: 1) inverse Fast Fourier Transform (IFFT) blocks and 2) inverse Discrete Fourier Transform (IDFT) blocks.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrate the mapping of data signals and control signals to OFDM subcarriers according to one embodiment of the present disclosure;

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

A transmission technique is disclosed for reducing the peak-to-average power (PAPR) ratio—or crest factor—of the transmitted waveforms for multi-carrier signals, such as orthogonal frequency division multiplexing (OFDM) or orthogonal frequency division multiple access (OFDMA) signals. Reducing PAPR provides improved power amplifier efficiency, reduced heat dissipation requirements, smaller heat sinks, reduced power supply load, and lower cost for wireless base stations and subscriber stations. In the descriptions that follow, it shall be assumed generally that transmitters and receivers are operating in OFDMA mode. However, this embodiment should not be construed to limit the scope of the disclosure. In alternate embodiments, the transmitters and receivers may operate in OFDM mode or another multi-carrier mode without departing from the principles of the disclosure.

Figure 1:
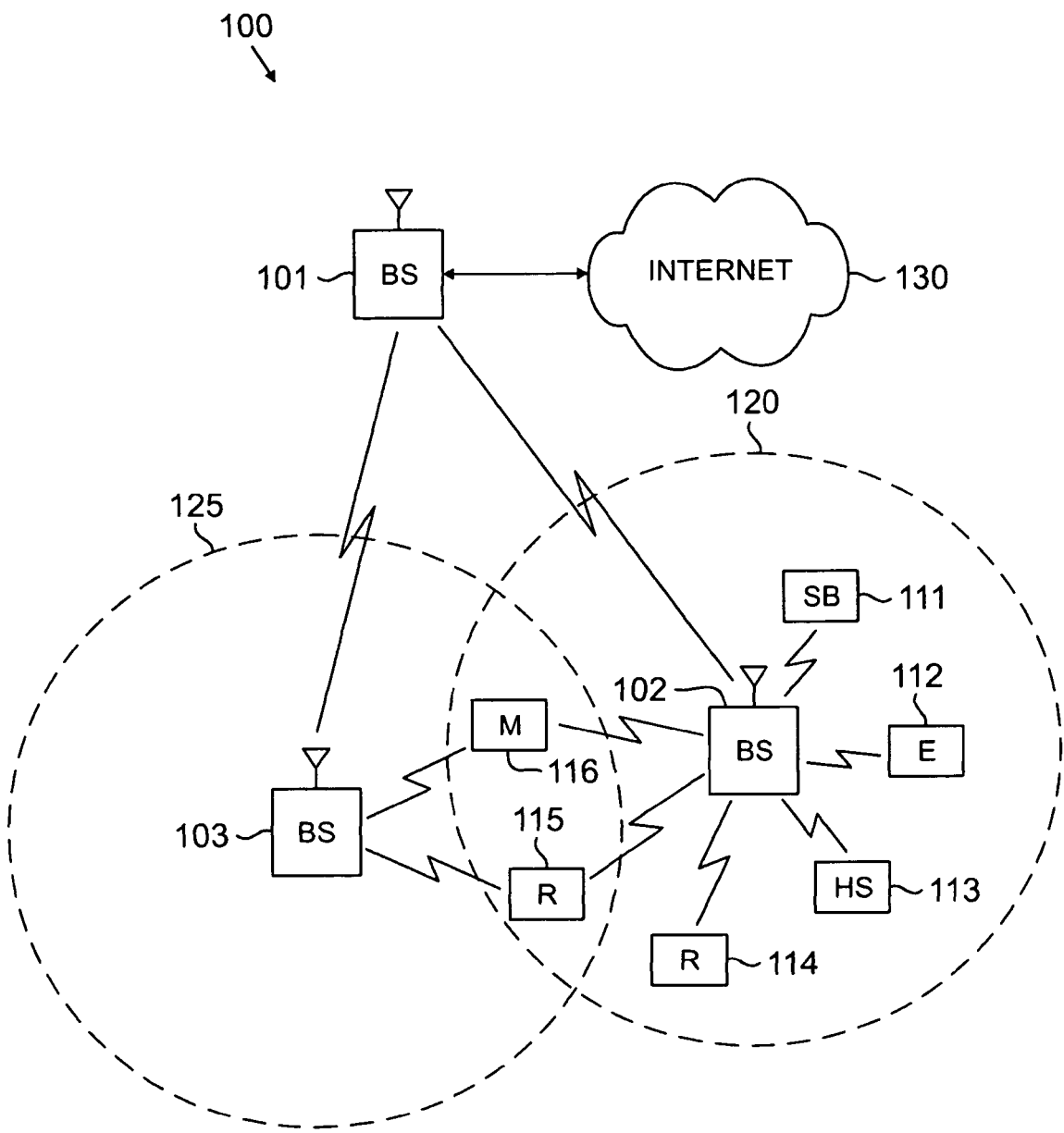
FIG. 1 illustrates an exemplary wireless network that reduces the peak-to-average power ratio (PAPR) or crest factor of OFDM or OFDMA signals according to the principles of the present disclosure.

FIG. 1 illustrates exemplary wireless network 100, which reduces peak-to-average power ratio (PAPR) of multi-carrier signals, such as OFDM and OFDMA signals, according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
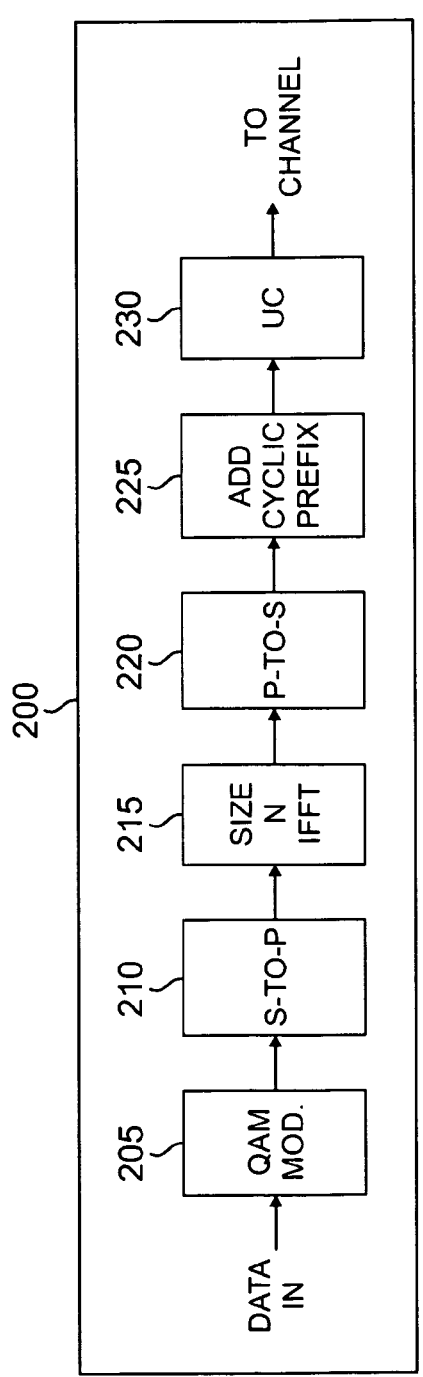
FIG. 2A is a high level block diagram of a conventional orthogonal frequency division multiple access (OFDMA) transmitter according to one embodiment of the prior art.
Figure 2B:
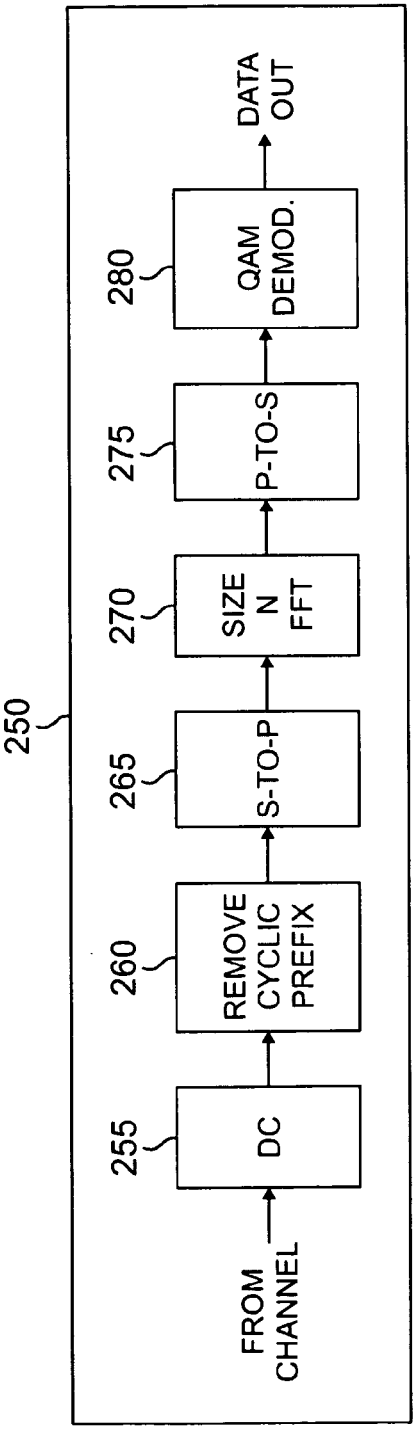
FIG. 2B is a high level block diagram of a conventional orthogonal frequency division multiple access (OFDMA) receiver according to one embodiment of the prior art.

FIG. 2A is a high-level diagram of conventional orthogonal frequency division multiple access (OFDMA) transmitter 200. FIG. 2B is a high-level diagram of conventional orthogonal frequency division multiple access (OFDMA) receiver 250. OFDMA transmitter 200 comprises quadrature amplitude modulation (QAM) modulator 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. OFDMA receiver 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, and quadrature amplitude modulation (QAM) demodulator 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the values of Size M (i.e., M1, M2, M3, M4) and Size N may be modified according to the implementation.

Furthermore, although the text and FIGS. 1-8 of the disclosure are directed to an embodiment that implements the Fast Fourier Transform and the Inverse Fast Fourier Transform, this is by way of illustration only and should not be construed to limit the scope of this disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the values of M (i.e., M1, M2, M3, M4) and N may be any integer numbers (i.e., 1, 2, 3, 4, etc.), while for FFT and IFFT functions, the values of M (i.e., M1, M2, M3, M4) and N may be any integer numbers that are powers of two (i.e., 1, 2, 4, 8, 16, etc.).

In OFDMA transmitter 200, QAM modulator 205 receives a set of information bits and modulates the input bits to produce a sequence of frequency-domain modulation symbols. Serial-to-parallel block 210 converts (i.e., de-multiplexes) the serial QAM symbols to parallel data to produce N parallel symbol streams where N is the IFFT/FFT size used in transmitter 200 and receiver 250. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal.

Finally, up-converter 230 modulates (i.e., up-converts) the output of add cyclic prefix block 225 to RF frequency for transmission via a wireless channel. The signal may also be filtered at baseband before conversion to RF frequency. The time-domain signal transmitted by OFDMA transmitter 200 comprises multiple overlapping sinusoidal signals corresponding to the data symbols transmitted. This results in a large peak-to-average power ratio (PAPR) at the transmitter amplifier and requires significant transmit power back-offs.

The transmitted RF signal arrives at OFDMA receiver 250 after passing through the wireless channel and reverse operations to those at OFDMA transmitter 200 are performed. Down-converter 255 down-converts the received signal to baseband frequency and remove cyclic prefix 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of QAM data symbols. QAM demodulator 280 then demodulates the QAM symbols to recover the original input data stream.

Figure 3:
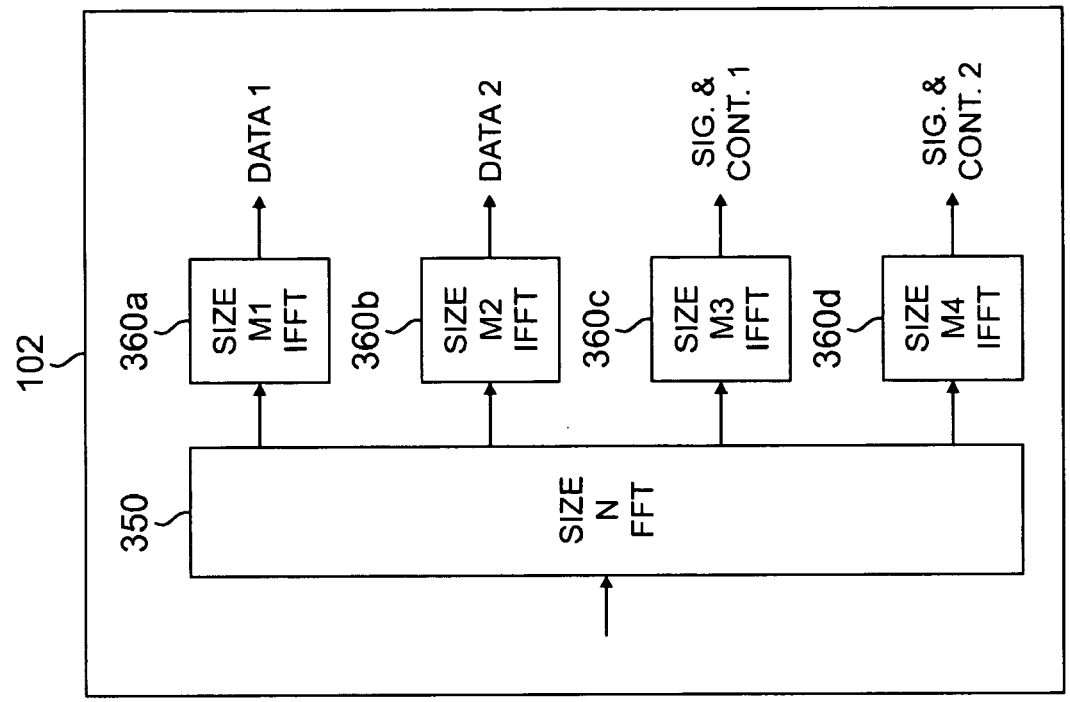
FIG. 3 illustrates selected portions of a subscriber station and a base station that implement power-efficient multiplexing for reducing the peak-to-average power ratio (PAPR) or crest factor of OFDM or OFDMA signals according to the principles of the present disclosure.
Figure 3:
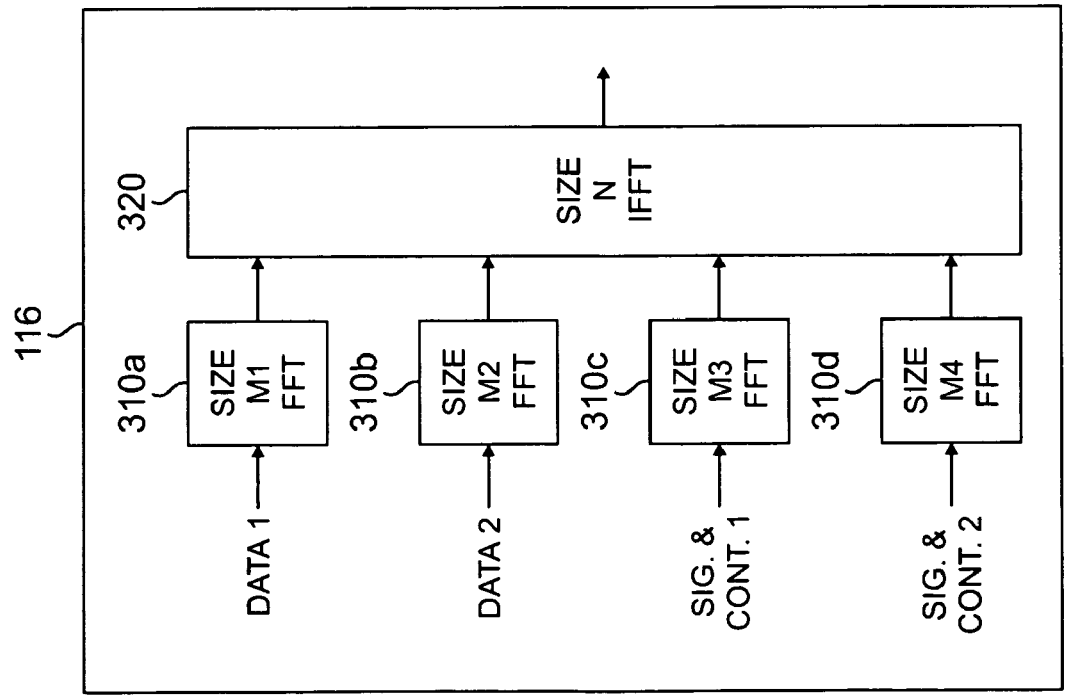

FIG. 3 illustrates selected portions of subscriber station 116 and base station 102, which implement power-efficient FFT pre-coding for reducing the peak-to-average power ratio (PAPR) of OFDMA signals according to the principles of the present disclosure. Subscriber station 116 comprises Size M1 Fast Fourier Transform (FFT) block 310a, Size M2 Fast Fourier Transform (FFT) block 310b, Size M3 Fast Fourier Transform (FFT) block 310c, Size M4 Fast Fourier Transform (FFT) block 310d, and Size N Inverse Fast Fourier Transform (IFFT) block 320. Base station 102 comprises Size N Fast Fourier Transform (FFT) block 350, Size M1 Inverse Fast Fourier Transform (IFFT) block 360a, Size M2 Inverse Fast Fourier Transform (IFFT) block 360b, Size M3 Inverse Fast Fourier Transform (IFFT) block 360c, and Size M4 Inverse Fast Fourier Transform (IFFT) block 360d.

According to the principles of the disclosure, prior to the IFFT operation in subscriber station 116, at least one stream of user data information and at least one stream of signaling and control information may be pre-coded by means of separate FFT operations in order to reduce the PAPR of the transmitted signal. In the example illustrated in FIG. 3, Size M1 FFT block 310a pre-codes a first stream, Data 1, of user data symbols by performing a size M1 FFT operation and Size M2 FFT block 310b pre-codes a second stream, Data 2, of user data symbols by performing a size M2 FFT operation. Similarly, Size M3 FFT block 310c pre-codes a first stream, Signal & Control 1, of signaling and control symbols by performing a size M3 FFT operation and Size M4 FFT block 310d pre-codes a second stream, Signal & Control 2, of signaling and control symbols by performing a size M4 FFT operation.

By way of example, the first data stream, Data 1, may be generated by a first user application executed in SS 116 and the second data stream, Data 2, may be generated by a second user application executed in SS 116. The first user application may generate one or both of the signaling and control streams, Signal & Control 1 and Signal & Control 2. Similarly, the second user application may also generate one or both of the signaling and control streams, Signal & Control 1 and Signal & Control 2.

The FFT pre-coded data from each of FFT blocks 310*a-d* are then mapped to a subset of the OFDMA subcarriers (i.e., tones) and a size N IFFT operation is performed, where N is greater than or equal to the sum M1+M2+M3+M4. The FFT pre-codings performed by Size M FFT blocks 310*a-d* result in time-domain signals that have relatively lower PAPR, thus making efficient use of the capacity of the power amplifier (not shown) in subscriber station 116.

It should be noted that the size N of Size N IFFT block 320 may exceed the sum of M1, M2, M3, and M4, so that Size N IFFT block 320 also receives user data and/or signaling and control information that has not been FFT pre-coded. This is also true of the exemplary embodiments illustrated and described hereafter in FIGS. 4-8. The non-FFT pre-coded user data or signaling and control information may be generated by the first user application, the second user application, or some other source in SS 116.

In base station 102, Size N FFT block 350 performs a size N FFT operation on the received signal to recover the FFT pre-coded user data information and signaling and control information. The size N FFT operation performed by Size N FFT block 350 on the received signal also recovers any user data information and/or signaling and control information that was not FFT pre-coded. Optionally, the data symbols may be equalized (not shown) in the frequency-domain using the frequency-domain pilot information.

After equalization (if any), Size M1 IFFT block 360*a* performs an IFFT operation on a first selected subset of the pre-coded symbols received from Size N FFT block 350 to recover the first stream of user data symbols, Data 1. Size M2 IFFT block 360*b* performs an IFFT operation on a second selected subset of the pre-coded symbols received from Size N FFT block 350 to recover the second stream of user data symbols, Data 2. Similarly, Size M3 IFFT block 360*c* performs an IFFT operation on a third selected subset of the pre-coded symbols received from Size N FFT block 350 to recover the first stream of signaling and control symbols, Signal and Control 1. Lastly, Size M4 IFFT block 360*d* performs an IFFT operation on a fourth selected subset of the pre-coded symbols received from Size N FFT block 350 to recover the second stream of signaling and control symbols, Signal and Control 2.

Figure 4:
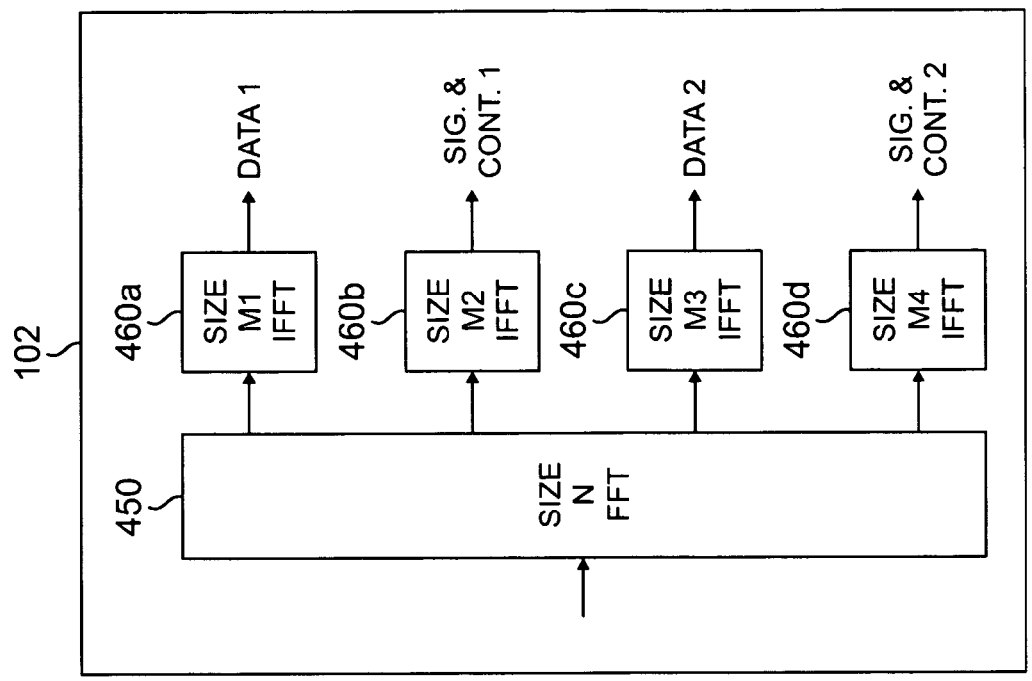
FIG. 4 illustrates selected portions of subscriber stations and a base station in which selective FFT pre-coding of data and control signals in a power-limited subscriber station is implemented according to the principles of the present disclosure.
Figure 4:
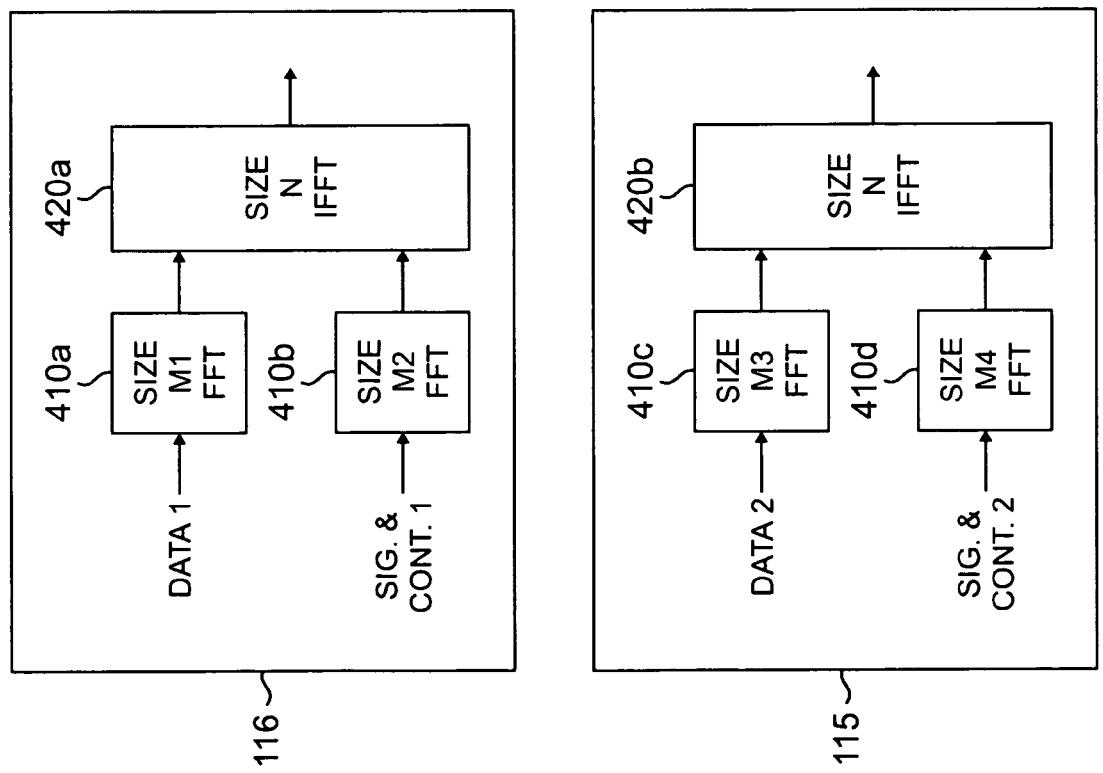

FIG. 4 illustrates selected portions of subscriber stations 116 and 115 and base station 102 in which selective FFT pre-coding of data and control signals in power-limited subscriber stations 115 and 116 is implemented according to the principles of the disclosure. Subscriber station (SS) 116 comprises Size M1 Fast Fourier Transform (FFT) block 410*a*, Size M2 Fast Fourier Transform (FFT) block 410*b*, and Size N Inverse Fast Fourier Transform (IFFT) block 420*a*. Subscriber station (SS) 115 comprises Size M3 Fast Fourier Transform (FFT) block 410*c*, Size M4 Fast Fourier Transform (FFT) block 410*d*, and Size N Inverse Fast Fourier Transform (IFFT) block 420*b*. Base station (BS) 102 comprises Size N Fast Fourier Transform (FFT) block 450, Size M1 Inverse Fast Fourier Transform (IFFT) block 460*a*, Size M2 Inverse Fast Fourier Transform (IFFT) block 460*b*, Size M3 Inverse Fast Fourier Transform (IFFT) block 460*c*, and Size M4 Inverse Fast Fourier Transform (IFFT) block 460*d*.

In FIG. 4, SS 116 and SS 115 are power-limited (e.g., near cell edge) and must perform FFT pre-coding. Thus, in SS 116, Size M1 FFT block 410*a* pre-codes user data symbols, Data 1, by performing a size M1 FFT operation and Size M2 FFT block 410*b* pre-codes signaling and control symbols, Signal & Control 1, by performing a size M2 FFT operation. Similarly, in SS 115, Size M3 FFT block 410*c* pre-codes user data symbols, Data 2, by performing a size M3 FFT operation and Size M3 FFT block 410*d* pre-codes signaling and control symbols, Signal & Control 2, by performing a size M4 FFT operation.

However, other subscriber stations (not shown) communicating with BS 102 may not be power-limited (e.g., are near BS 102) and the FFT pre-coding step is omitted. The signals from these other subscriber stations may result in potentially higher PAPR. However, the non-power limited subscriber stations may back off the uplink transmit power from peak power levels because excess power headroom is available.

SS 116 and SS 115 use control messages to indicate to BS 102 that SS 116 and SS 115 are operating in power limited mode. Thus, BS 102 knows which subscriber stations are using FFT pre-coding and which subscriber stations are not, and also knows which user data streams and/or signaling and control streams are pre-coded. As a result, in base station 102, Size N FFT block 450 performs a size N FFT operation on the received signal to recover the incoming signals from SS 115 and SS 115. However, Size M1 IFFT block 460*a* performs an IFFT operation only on FFT pre-coded data from SS 116 to recover the Data 1 symbols and Size M2 IFFT block 460*b* performs an IFFT operation only on FFT pre-coded signaling and control information from SS 116 to recover the Signal and Control 1 symbols. Similarly, Size M3 IFFT block 460*c* performs an IFFT operation only on FFT pre-coded data from SS 115 to recover the Data 2 symbols and Size M4 IFFT block 460*c* performs an IFFT operation only on FFT pre-coded signaling and control information from SS 115 to recover the Signal and Control 2 symbols.

Figure 5A:
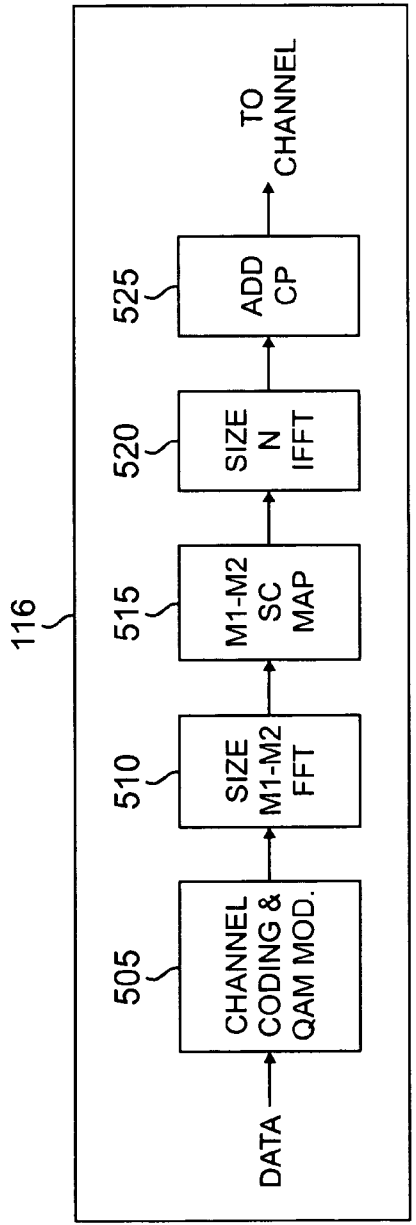
FIG. 5A is a high level block diagram of a subscriber station that implements FFT pre-coding according to one embodiment of the present disclosure.
Figure 5B:
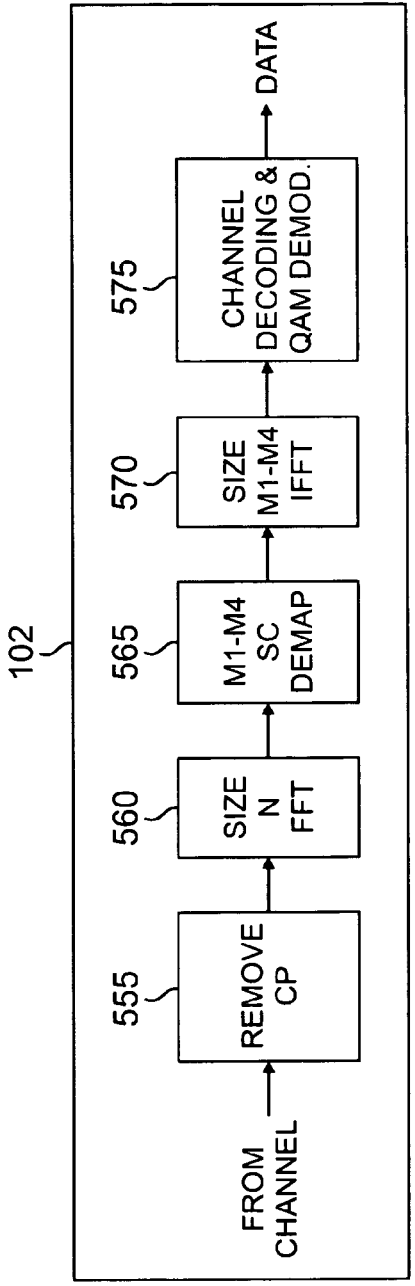
FIG. 5B is a high level block diagram of a base station that supports FFT pre-coded data according to one embodiment of the present disclosure.

FIG. 5A is a high level block diagram of subscriber station 116, which implements FFT pre-coding according to the principles of the present disclosure. FIG. 5B is a high level block diagram of base station 102, which supports FFT pre-coded data according to the principles of the present disclosure. Subscriber station 116 comprises channel coding and QAM modulation block 505, Size M1-M2 FFT block 510, M1-M2 subcarriers (SC) mapping block 515, Size N IFFT block 520, and add cyclic prefix block 525. Base station 102 comprises remove cyclic prefix block 555, Size N FFT block 560, M1-M4 subcarriers demapping block 565, Size M1-M4 IFFT block 570, and channel decoding and QAM demodulation block 575.

Channel coding and QAM modulation block 505 receives incoming data traffic bits and performs channel coding (e.g., turbo coding, Viterbi coding, etc.) and modulation to produce a stream of symbols. Size M1-M2 FFT block 510 then FFT pre-codes the data symbols and the signal and control symbols by performing at least two FFT operations—in this case, Size M1 and Size M2 FFT operations. After the FFT operations, M1-M2 subcarrier mapping block 515 maps the FFT pre-coded data symbols to M1 subcarriers and maps the FFT pre-coded signal and control symbols to M2 subcarriers out of a total of N subcarriers at the inputs of Size N IFFT block 520. Other data and control information (not shown) may also be mapped directly (i.e., without FFT pre-coding) to predetermined subcarrier inputs of Size N IFFT block 520. Next, Size N IFFT block 520 performs a size N IFFT operation to generate a time domain signal. Add cyclic prefix block 525 adds a cyclic prefix to the time-domain signal from Size N IFFT block 520 before up-conversion (not shown) to the RF frequency for transmission.

A sequence of reverse operations is performed in base station (BS) 102. BS 102 comprises down-conversion circuitry (not shown) that generates a baseband signal from the received RF signal. After down-conversion, remove cyclic prefix block 555 removes the cyclic prefix from the time-domain baseband signal. Size N FFT block 560 converts the baseband signal to a frequency domain signal. The user data and/or control and signaling information that was not FFT pre-coded in subscriber stations is recovered directly from the outputs of Size N FFT block 560.

M1-M4 subcarriers demapping block 565 demaps the FFT pre-coded data for SS 116 from M1 the outputs of Size N FFT block 560 to M1 of the inputs of Size M1-M4 IFFT block 570 and demaps the FFT pre-coded control and signal information for SS 116 from M2 of the outputs of Size N FFT block 560 to M2 of the inputs of Size M1-M4 IFFT block 570. Similarly, M1-M4 subcarriers demapping block 565 demaps the FFT pre-coded information for at least one other subscriber station (e.g., SS 115) to M3 of the inputs and M4 of the inputs of Size M1-M4 IFFT block 570. Size M1-M4 IFFT block 570 then performs multiple IFFT operations of size M1, size M2, size M3, and size M4, to recover the original coded and modulated data symbols from SS 116 and other subscriber stations (e.g., SS 115). Finally, channel decoding and QAM demodulation block 575 demodulates and decodes the data symbols to recover the original user data traffic bits.

FIG. 6 illustrates the mapping of data information and signaling and control information to OFDM/OFDMA subcarriers according to one embodiment of the present disclosure. The subcarrier (SC) frequencies and OFDM symbols within one transmission time interval (TTI) are shown. It is assumed that a total of 394 subcarriers (or tones), labeled SC 000 through SC 393, are available for data and signaling transmission out of a total of 512 subcarriers. Thus, the IFFT size is N=512.

The data symbols, D1, from a first subscriber station (e.g., SS 116) are FFT pre-coded with a size M1=256 FFT operation and are mapped to subcarriers SC 000 through 255. The signaling and control symbols, S1, from the first subscriber station are FFT pre-coded with a size M2=2 operation and are mapped to subcarriers SC 256 and SC 257. The data symbols, D2, from a second subscriber station are FFT pre-coded with a size M3=128 operation and are mapped to subcarriers SC 258 through SC 385. The signaling and control symbols, S2, from the second subscriber station are FFT pre-coded with a size M4=8 operation and are mapped to subcarriers SC 386 through SC 393.

The present disclosure allows multiplexing of FFT pre-coded data and signaling from multiple users in the same OFDM symbol. In the example of FIG. 6, the data and signaling symbols are mapped to contiguous subcarriers. However, the principles of the present disclosure also apply when the mapping of FFT pre-coded data and signaling is done on distributed subcarriers. The signaling and control information in the uplink of a wireless packet data system generally consists of random access requests, resource requests, downlink channel quality feedback for adaptive modulation and coding (AMC) and scheduling, Acknowledgment or Negative acknowledgment (ACK/NACK) feedback for downlink hybrid ARQ, AMC and hybrid ARQ control information for the uplink packets, and the like. An example of FFT pre-coding and multiplexing for some of the control information is shown in FIG. 6. Different signaling types may be FFT pre-coded separately and then mapped to orthogonal subcarriers at the input of the IFFT block. However, it is also possible to time-multiplex some of the signaling types before FFT pre-coding. The resulting sequence at the output of the FFT blocks are then mapped to the orthogonal subcarriers.

Figure 7:
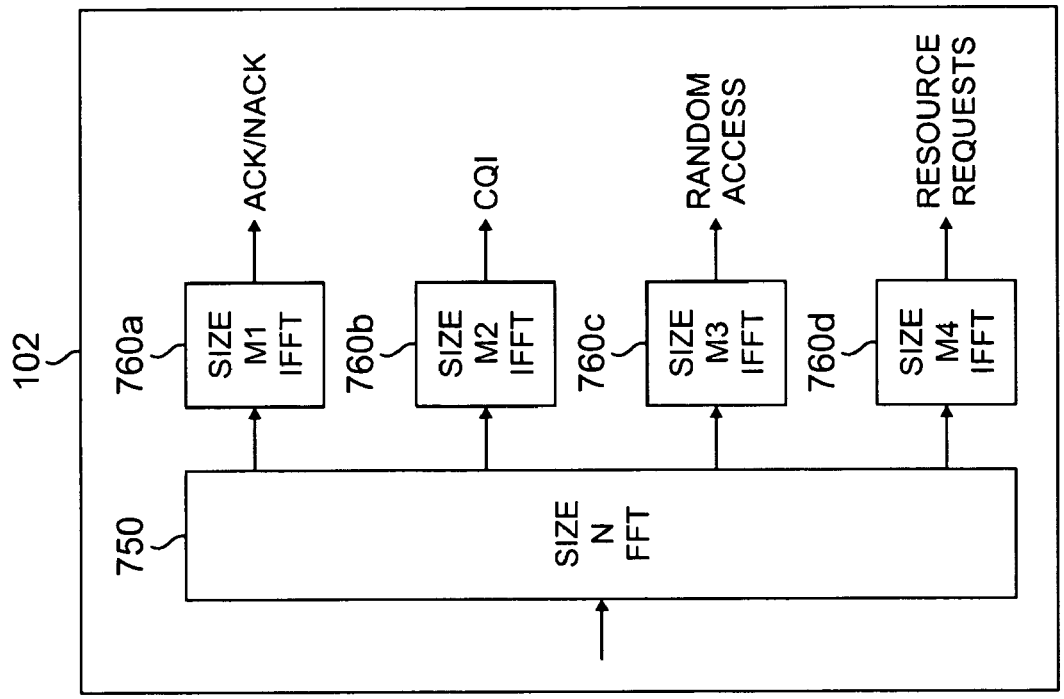
FIG. 7 illustrates selected portions of a subscriber station and a base station that implement selective FFT pre-coding of data and control signals according to one embodiment of the present disclosure.
Figure 7:
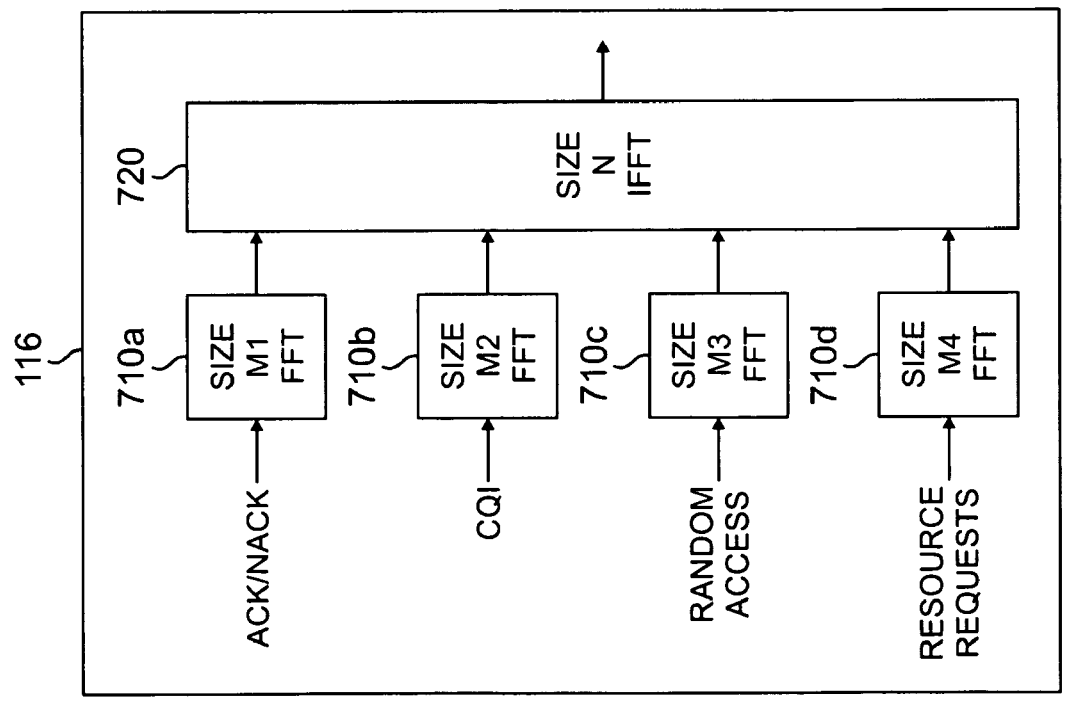

FIG. 7 illustrates selected portions of subscriber station 116 and base station 102 that implement selective FFT pre-coding of signaling and control information according to one embodiment of the present disclosure. In this embodiment, Size M1 FFT block 710*a* pre-codes ACK/ACK symbols, Size M2 FFT block 710*b* pre-codes CQI symbols, Size M3 FFT block 710*c* pre-codes random access symbols, and Size M4 FFT block 710*d* pre-codes resource requests symbols. Size N IFFT block 720 performs an IFFT operation (i.e., multiplexes) on the FFT pre-coded signaling and control information, where N is greater than or equal to the sum of M1, M2, M3, and M4.

In BS 102, Size N FFT block 750 recovers the FFT pre-coded signaling and control information. Next, Size M1 IFFT block 760*a* recovers the original ACK/NACK symbols, Size M2 IFFT block 760*b* recovers the original CQI symbols, Size M3 IFFT block 760*c* recovers the original random access symbols, and Size M4 IFFT block 760*d* then recovers the original resource requests symbols.

Figure 8:
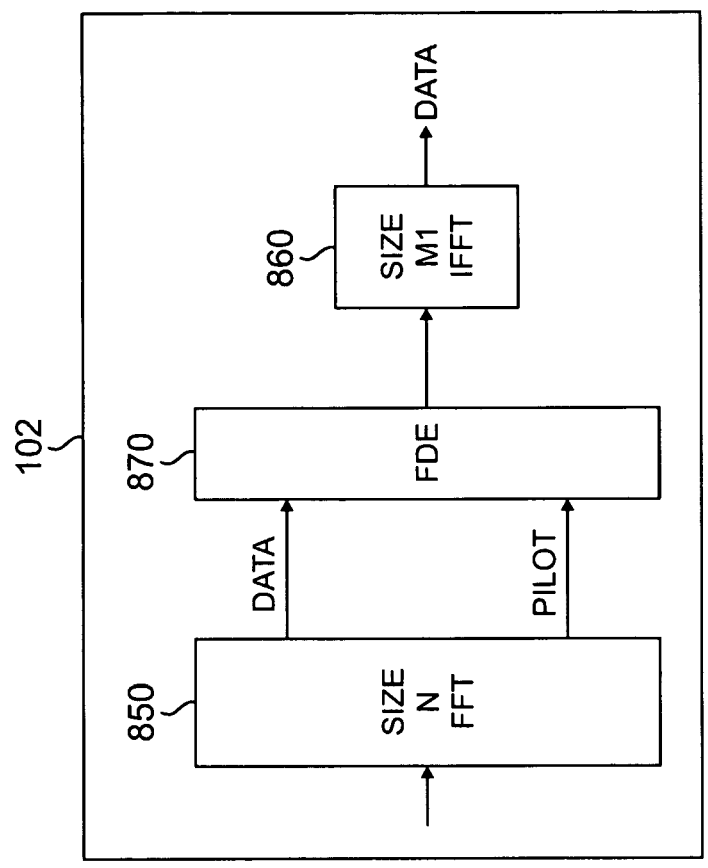
FIG. 8 illustrates selected portions of a subscriber station and a base station that implement selective FFT pre-coding of data and control signals and frequency domain equalization (FDE) according to an embodiment of the present disclosure.
Figure 8:
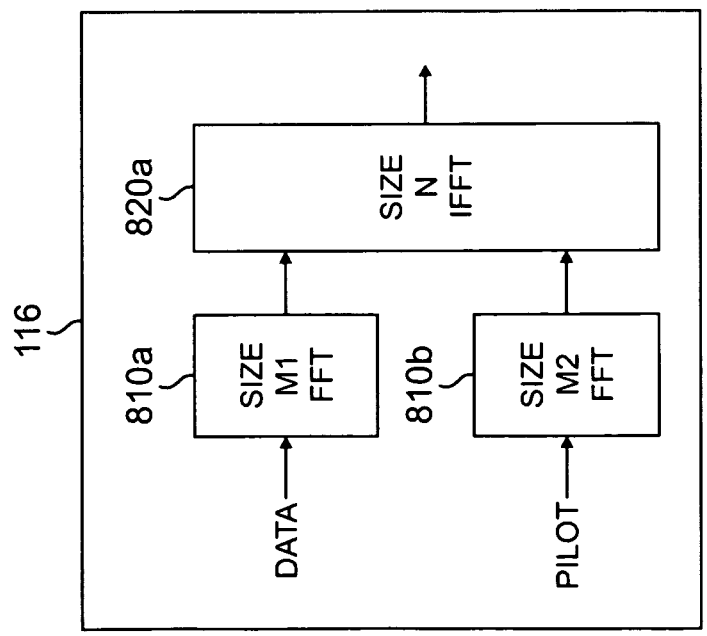

FIG. 8 illustrates selected portions of subscriber station (SS) 116 and base station (BS) 102 that implement selective FFT pre-coding of data and frequency domain equalization (FDE) according to another embodiment of the present disclosure. SS 116 comprises Size M1 FFT block 810*a*, Size M2 FFT block 810*b*, and Size N IFFT block 820. BS 102 comprises Size N FFT block 850, Size M1 IFFT block 860, and frequency domain equalizer (FDE) 870.

Size M1 FFT block 810*a* pre-codes the data traffic by performing a size M1 FFT operation. Similarly, Size M2 FFT block 810*b* pre-codes the pilot signal by performing a size M2 FFT operation. The FFT pre-coded data are then mapped to a subset (=M1) of the OFDMA subcarriers and the FFT pre-coded pilot signal is mapped to a subset (=M2) of the OFDMA subcarriers. Size N IFFT block 820 performs a size N IFFT operation (where N is greater than or equal to M1+M2) on the FFT pre-coded data symbols and the FFT pre-coded pilot signal.

In base station 102, Size N FFT block 850 performs a size N FFT operation on the received signal to recover the FFT pre-coded data and the FFT pre-coded pilot signal. Since the pilot signal is a fixed, known sequence, the frequency-domain equivalent of the pilot signal also is known in BS 102. A Size M2 IFFT operation is not needed in order to use the pilot signal for equalization purposes. Thus, FDE 870 uses the recovered pilot signal in the frequency domain to equalize the FFT pre-coded data in the frequency-domain. Finally, Size M1 IFFT block 860 converts the equalized data symbols from the frequency domain to the time domain.

As noted above, in an alternate embodiment of the present disclosure, Discrete Fourier Transform (DFT) functions and Inverse Discrete Fourier Transform (IDFT) functions may be used in lieu of Fast Fourier Transform functions and Inverse Fast Fourier Transform, respectively. In such an embodiment, the FFT blocks and the IFFT blocks in the figures above may be replaced by DFT blocks and IDFT blocks.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network, a subscriber station capable of communicating with the wireless network according to a multi-carrier protocol, the subscriber station comprising:
 a size M1 Fourier Transform (FT) block configured to receive user data input symbols for a user and generate therefrom M1 FT pre-coded outputs, M1 being a first non-negative integer;
 a size M2 Fourier Transform (FT) block configured to receive control input symbols for the user and generate therefrom M2 FT pre-coded outputs, M2 being a second non-negative integer; and
 a size N inverse Fourier Transform (TFT) block configured to receive N inputs, the N inputs including at least the M1 FT pre-coded outputs from the size M1 FT block and the M2 FT pre-coded outputs from the size M2 FT block, and generate therefrom N outputs to be transmitted to a base station of the wireless network.

2. The subscriber station as set forth in claim 1, wherein the size M1 FT block and the size M2 FT block are one of: 1) Fast Fourier Transform (FFT) blocks and 2) Discrete Fourier Transform (DFT) blocks, and the size N IFT block is one of: 1) an inverse Fast Fourier Transform (IFFT) block and 2) an inverse Discrete Fourier Transform (IDFT) block.

3. The subscriber station as set forth in claim 2, wherein the value of N is greater than or equal to the sum of M1 and M2.

4. The subscriber station as set forth in claim 2, wherein the size N IFT block receives on at least some of N−(M1+M2) inputs signaling and control symbols that have not been FT pre-coded by either the size M1 FT block or the size M2 FT block.

5. The subscriber station as set forth in claim 2, wherein the size N IFT block receives on at least some of N−(M1+M2) inputs user data symbols that have not been FT pre-coded by either the size M1 FT block or the size M2 FT block.

6. The subscriber station as set forth in claim 2, wherein the multi-carrier protocol comprises one of orthogonal frequency division multiplexing and orthogonal frequency division multiple access.

7. The subscriber station as set forth in claim 1, wherein the control input symbols comprise a pilot signal.

8. The subscriber station as set forth in claim 1, wherein the size M1 and the size M2 FT operations are performed when the subscriber station is power-limited.

9. The method as set forth in claim 1, further comprising a channel coding and quadrature amplitude modulation (QAM) configured to perform channel coding and modulation on a plurality of received incoming data traffic bits to produce the input symbols to be transmitted to the base station.

10. The method as set forth in claim 1, further comprising a subcarrier mapping block configured to map the M1 and M2 FT pre-coded outputs to the respective M1 and M2 subcarriers at the N inputs prior to performing the size N IFT operation.

11. For use in a subscriber station capable of communicating with a wireless network according to a multi-carrier protocol, a method for reducing the peak-to-average power ratio (PAPR) of a radio frequency signal transmitted by the subscriber station to a base station of the wireless network, the method comprising the steps of:
 receiving input symbols to be transmitted to the base station;
 performing a size M1 Fourier Transform (FT) operation on a first subset of the received input symbols for a user to thereby generate M1 FT pre-coded outputs, the first subset of the received input symbols comprising user data input symbols, M1 being a first non-negative integer;
 performing a size M2 Fourier Transform (FT) operation on a second subset of the received input symbols for the user to thereby generate M2 FT pre-coded outputs, the second subset of the received input symbols comprising control input symbols, M2 being a second non-negative integer; and
 performing a size N inverse Fourier Transform (IFT) operation on N inputs, the N inputs including at least the M1 FT pre-coded outputs and the M2 FT pre-coded outputs, to thereby generate N outputs to be transmitted to the base station.

12. The method as set forth in claim 11, wherein the size M1 FT operation and the size M2 FT operation are one of: 1) Fast Fourier Transform (FFT) operations and 2) Discrete Fourier Transform (DFT) operations, and the size N IFT operation is one of: 1) an inverse Fast Fourier Transform (IFFT) operation and 2) an inverse Discrete Fourier Transform (IDFT) operation.

13. The method as set forth in claim 12, wherein the value of N is greater than or equal to the sum of M1 and M2.

14. The method as set forth in claim 12, wherein the size N IFT operation receives on at least some of N−(M1+M2) inputs control symbols that have not been FT pre-coded by either the size M1 FT operation or the size M2 FT operation.

15. The method as set forth in claim 12, wherein the size N IFT operation receives on at least some of N−(M1+M2) inputs user data symbols that have not been FT pre-coded by either the size M1 FT operation or the size M2 FT operation.

16. The method as set forth in claim 12, wherein the multi-carrier protocol comprises one of orthogonal frequency division multiplexing and orthogonal frequency division multiple access.

17. The method as set forth in claim 11, wherein the control input symbols comprise a pilot signal.

18. The method as set forth in claim 1 further comprising determining whether to perform at least one of the size M1 and the size M2 FT operations based on whether the subscriber station is power-limited.

19. The method as set forth in claim 1 further comprising performing channel coding and modulation on a plurality of received incoming data traffic bits to produce the input symbols to be transmitted to the base station.

20. The method as set forth in claim 11, further comprising mapping the M1 and M2 FT pre-coded outputs to the respective M1 and M2 subcarriers at the N inputs prior to performing the size N IFT operation.

* * * * *